(12) United States Patent
Atallah et al.

(10) Patent No.: US 8,589,148 B2
(45) Date of Patent: Nov. 19, 2013

(54) NATURAL LANGUAGE WATERMARKING

(75) Inventors: Mikhail Mike Atallah, West Lafayette, IN (US); Srinivas Bangalore, Morristown, NJ (US); Dilek Z. Hakkani-Tur, Castro Valley, CA (US); Giuseppe Riccardi, Trento (IT); Mercan Topkara, West Lafayette, IN (US); Umut Topkara, West Lafayette, IN (US)

(73) Assignees: AT&T Intellectual Property II, L.P., Atlanta, GA (US); Perdue Research Foundation, West Lafayette, IN (US)

( * ) Notice: Subject to any disclaimer, the term of this patent is extended or adjusted under 35 U.S.C. 154(b) by 2114 days.

(21) Appl. No.: 11/279,835

(22) Filed: Apr. 14, 2006

(65) Prior Publication Data

US 2007/0244693 A1    Oct. 18, 2007

(51) Int. Cl.
*G06F 17/27* (2006.01)

(52) U.S. Cl.
USPC ........... 704/9; 704/1; 704/2; 704/10; 704/272

(58) Field of Classification Search
USPC ....................................... 704/9, 1, 10, 2, 272
See application file for complete search history.

(56) References Cited

U.S. PATENT DOCUMENTS

| | | | |
|---|---|---|---|
| 6,643,384 B1 * | 11/2003 | Naito et al. | 382/100 |
| 7,039,189 B1 * | 5/2006 | Kienzle et al. | 380/239 |
| 7,167,825 B1 * | 1/2007 | Potter | 704/9 |
| 2008/0126078 A1 * | 5/2008 | Starkie | 704/9 |

OTHER PUBLICATIONS

Topkara et al., "natural language watermarking", Proceedings of the SPIE International Conference, Jan. 17-21, 2005.*
Bennett, "linguistic steganography: survey, analysis, and robustness concerns for hiding information in text", CERIAS Tech Report 2004-13.*
Mercan Topkara, Giuseppe Riccardi, Dilek Hakkani-Tur, Mikhail Atallah: "Natural language watermarking: challenges in building a practical system" Proceedings of the SPIE, Security, Steganography, and Watermarking of Multimedia Contents VIII; col. 6072, Feb. 15, 2006, XP002467639.
Yuling Liu et al. "A Natural Language Watermarking Based on Chinese Syntax" Advances in Natural Computation Lecture Notes in Computer Science; LNCS, Springer-Verlag, BE, vol. 3612, 2005, pp. 958-961, XP019014419 ISBN: 3-540-28320-X abstract p. 959, line 22—p. 961, last line.
M.J. Atallah, et al. "Natural Language Watermarking and Tamperproofing", CERIAS, fifteen pages; 2002.
M.J. Atallah, et al. "Natural Language Watermarking: Design, Analysis, and a Proof-of-Concemt Implementation", CERIAS tEch Report 2001-0013 , sixteen pages. 2001.
M.J. Atallah, et al., "Natural Language Processing for Information Assurance and Security: An Overview and Implementations" CERIAS, fifteen pages, 2002.

* cited by examiner

*Primary Examiner* — Qi Han

(57) ABSTRACT

A method, system and machine-readable medium are provided for watermarking natural language digital text. A deep structure may be generated and a group of features may be extracted from natural language digital text input. The deep structure may be modified based, at least partly, on a watermark. Natural language digital text output may be generated based on the modified deep structure.

22 Claims, 11 Drawing Sheets

( S_r ( S_f ( NP ( N_r ( A forced )
                        ( N_f repatriation ) ) )
        ( S_r ( NP )
            ( VP_r ( V is )
                ( VP ( V v )
                    ( PP_1 ( P against )
                        ( NP_r ( NP_f ( N_r ( N international )
                                        ( N_f convertions ) ) )
                        ( PP ( P on )
                            ( NP ( N refugees ) ) ) ) ) ) ) ) ) )
    ( Punct . ) )

|    | F1 | F2 | M1 |
|----|----|----|----|
| S1 | 0  | 1  | 0  |
| S2 | 0  | 0  | 1  |
| S3 | 0  | 1  | 0  |
| S4 | 0  | 0  | 1  |
| S5 | 0  | 0  | 1  |
| S6 | 1  | 1  | 0  |

FIG. 5

| FEATURE | VALUE |
|---|---|
| <agr 3rdsing> | +,- |
| <agr num> | plur,sing |
| <agr pers> | 1,2,3 |
| <agr gen> | fem,masc,netter |
| <assign-case> | nom,acc,none |
| <assign-comp> | that,whether,if,for,ecm,rel,inf,_nil,ind_nil,ppart_nil,none |
| <card> | +,- |
| <case> | nom,acc,gen,none |
| <comp> | that,wheter,if,for,rel,inf_nil,ind_nil,nil |
| <compar> | +,- |
| <compl> | +,- |
| <conditional> | +,- |
| <conj> | and,or,but,comma,scolon,to,disc,nil |
| <const> | +,- |
| <contr> | +,- |
| <control> | no value, indexing only |
| <decreas> | +,- |
| <definite> | +,- |
| <displ-const> | +,- |
| <equiv> | +,- |
| <extracted> | +,- |
| <gen> | +,- |
| <gerund> | +,- |
| <inv> | +,- |
| <invlink> | no value, indexing only |
| <irrealis> | +,- |
| <mainv> | +,- |
| <mode> | base,ger,ind,inf,imp,nom,ppart,prep,sbjunt |
| <neg> | +,- |
| <passive> | +,- |
| <perfect> | +,- |
| <pred> | +,- |

| | |
|---|---|
| <progressive> | +,- |
| <pron> | +,- |
| <punct bal> | dquote,squote,paren,nil |
| <punct contains colon> | +,- |
| <punct contains dash> | +,- |
| <punct contains dquote> | +,- |
| <punct contains scolon> | +,- |
| <punct contains squote> | +,- |
| <punct struct> | comma,dash,colon,scolon,nil |
| <punct term> | per,qmark,excl,nil |
| <quan> | +,- |
| <refl> | +,- |
| <rel-clause> | +,- |
| <rel-pron> | ppart,ger,adj-clause |
| <select-mode> | ind,inf,ppart,ger |
| <super> | +,- |
| <tense> | pres,past |
| <trace> | no value, indexing only |
| <weak> | +,- |
| <wh> | +,- |

FIG. 7

DSYNTS:
  against[ class:preposition ]
    ( I repatriation[ class:common_noun article:no-art number:sg ]
      ( ATTR forced[ class:adjective ])
    II conventions[ class:common_noun article:no-art ]
      ( ATTR international [ class:common_noun article:no-art number:sg ]
      II on [ class:preposition ]
        ( II refugess[ class:common_noun article:no-art ]))
    III be[ class:verb number:sg person:3rd case:nom tense:pres aspect:simple ])
END:

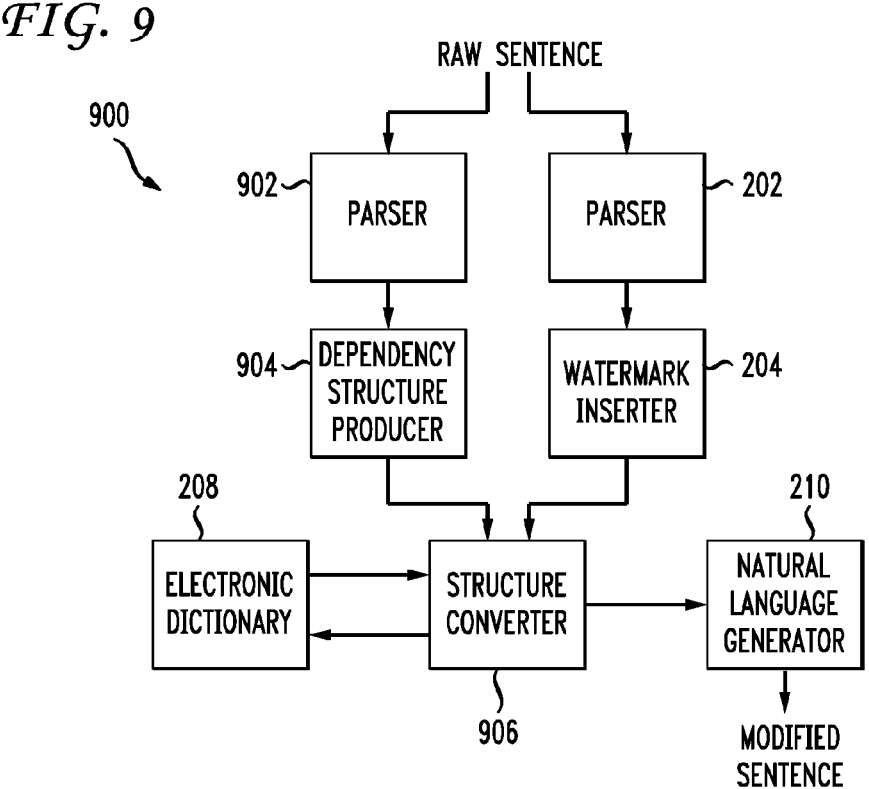

FIG. 9

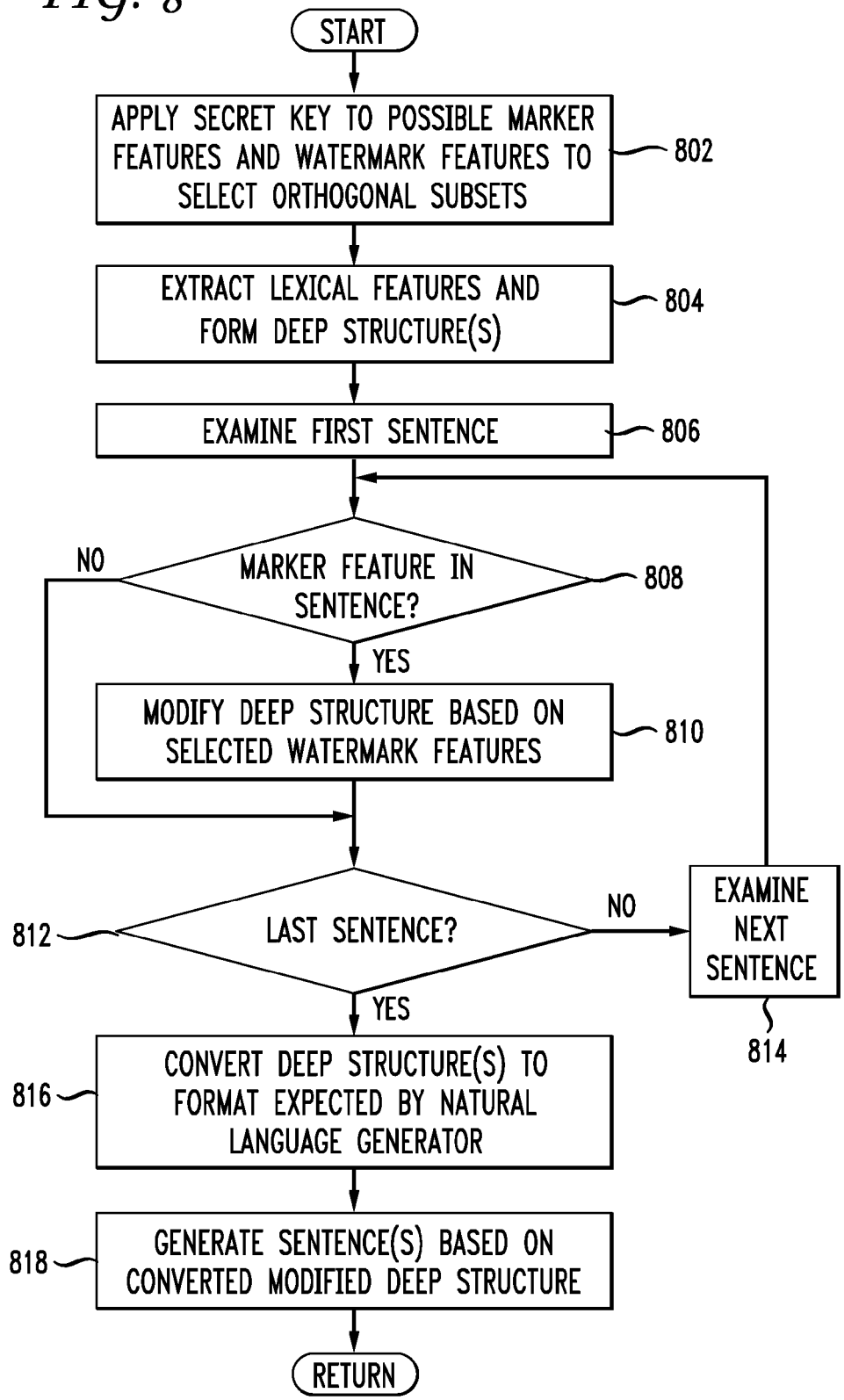

FIG. 10

( (S (NP (JJ forced) (NN repatriation))
    (VP (MD is)
      (PP (IN against)
        (NP (NP (JJ international) (NNS conventions))
          (PP (IN on) (NP (NNS refugees))))))
    (. .)))

FIG. 11

| ChildIndex | Child | POSTag$_{child}$ | ParentIndex | Parent | POSTag$_{parent}$ |
|---|---|---|---|---|---|
| 0 | forced | JJ | 2 | repatriation | NN |
| 1 | repatriation | NN | 2 | against | IN |
| 2 | is | MD | 2 | against | IN |
| 3 | against | IN | 1 | TOP | – |
| 4 | international | JJ | 2 | conventions | NNS |
| 5 | conventions | NNS | 1 | against | IN |
| 6 | on | IN | 2 | conventions | NNS |
| 7 | refugees | NNS | 1 | on | IN |
| 8 | . | . | -1 | – | – |

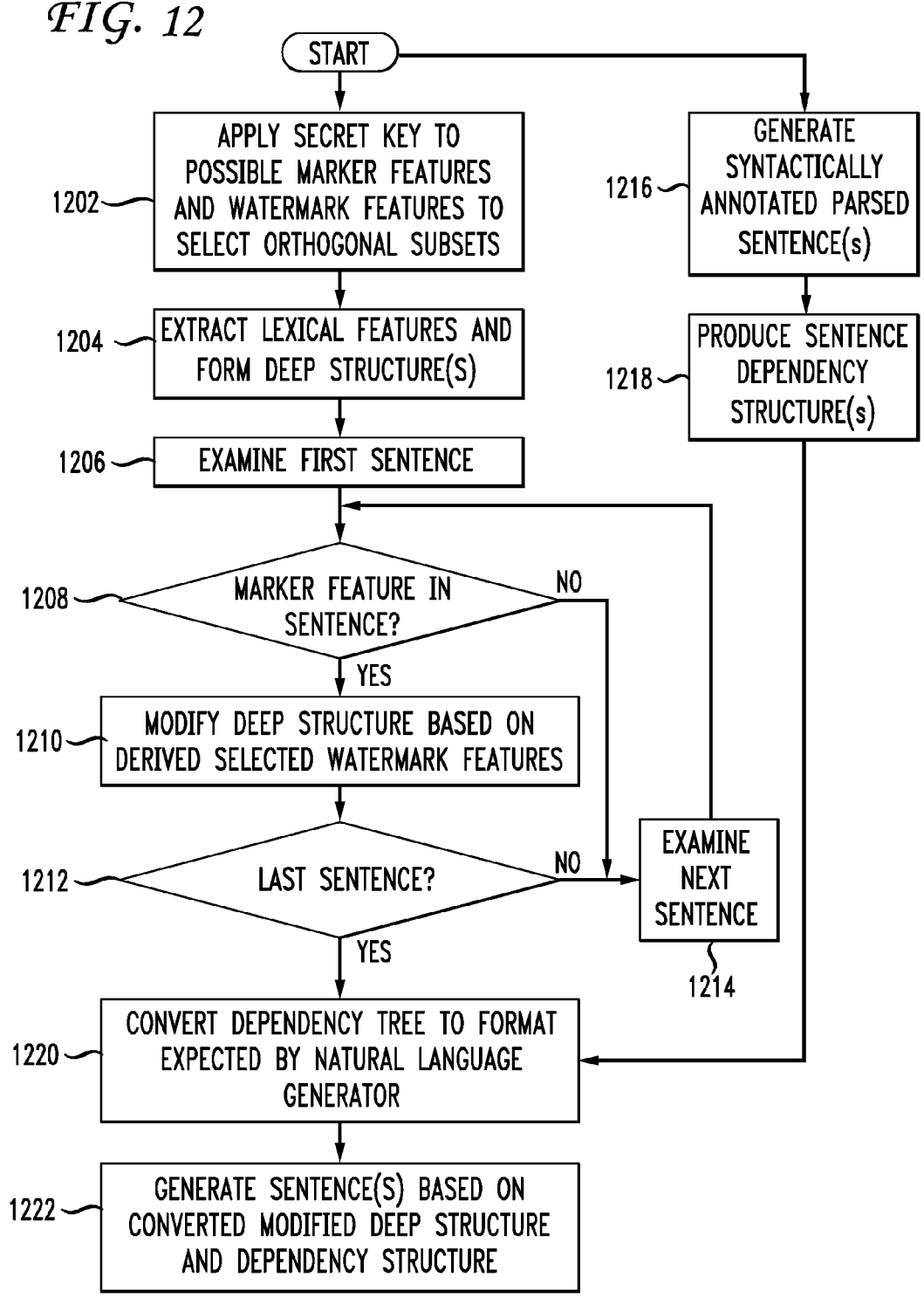

NATURAL LANGUAGE WATERMARKING

BACKGROUND OF THE INVENTION

1. Field of the Invention

The present invention relates to watermarking of natural language digital text and more specifically to a system and method for watermarking natural language digital text while retaining a meaning of the original natural language digital text.

2. Introduction

The ability to search and access immense amounts of digital text online has become commonplace. As a result of this ability, owners or authors of the digital text have lost control with respect to how the digital text is distributed or used. A way to restore control to authors or owners over distribution and use of digital text is needed.

In audio or image watermarking an input signal s(t) is processed to insert a watermark w(t) via a function $\hat{s}(t)=F(s(t), w(t), k)$, where k is the secret key. The watermarked signal $\hat{s}(t)$ is such that the w(t) becomes either visible/audible or retrievable by applying a function $G(\hat{s}(t), k)$. The function $F( )$ is designed such that the modified signal is perceptually equivalent to the original signal.

Natural language watermarking poses two research challenges in contrast to audio and image watermarking. First, there is successful experimental work on developing models for auditory and visual perception, whereas automatic semantic text analysis and evaluation is not well developed. Recent progress in machine translation research has led to a first step in addressing adequacy of machine translated text, while other text features such as coherence and fluency are being studied. Second, a number of bits that can be used to carry a watermark on natural language digital text is less than that used for audio or image watermarking. For example, entropy is less than 2 bits (character level 2) for the English language and it is less than 5 bits for standard images. Attacks such as text cropping can further decrease available bits for storing the watermark.

The combinatorial nature of natural language creates another challenge for a watermark embedding process. Natural language has a combinatorial syntax and semantics. Operations on natural language constituents (e.g., phrases, sentences, paragraphs) are sensitive to a syntactic/formal structure of representations defined by this combinatorial syntax.

Use of semantics and syntax of text for insertion of a watermark was previously proposed. In that work, binary encodings of words were used to embed information into the text by performing lexical substitution in synonym sets.

In later work, two algorithms were proposed for embedding information in a tree structure of the text. The watermark was not directly embedded in the text, as is done in lexical substitution, but was instead embedded into a parsed representation of sentences. The utilization of an intermediate representation makes the algorithms more robust to attacks than systems based on lexical substitution. One of the proposed algorithms modifies syntactic parse trees of cover text sentences for embedding while a second algorithm uses semantic tree representations. Selection of sentences that will carry the watermark information depends only on the tree structure. Once the sentences to embed watermark bits are selected, the bits are stored by applying either syntactic or semantic transformations. In that work, semantic transformations were designed to preserve the meaning of the overall text, but did not necessarily preserve the meaning of every individual sentence.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by practice of the invention as set forth herein.

In a first aspect of the invention, a method is provided for watermarking natural language digital text. A deep structure may be generated and a group of features may be extracted from natural language digital text input. The deep structure may be modified based, at least partly, on a watermark. Natural language digital text output may be generated based on the modified deep structure.

In a second aspect of the invention, a machine-readable medium having instructions recorded thereon for at least one processor is provided. The machine-readable medium may include instructions for generating a deep structure and extracting a group of features from natural language digital text input, instructions for modifying the deep structure based, at least partly, on a watermark, and instructions for generating natural language digital text output based on the modified deep structure.

In a third aspect of the invention, a system for watermarking natural language digital text is provided. The system may include a parser, a watermark inserter and a natural language generator. The parser may be configured to generate a deep structure and extract a plurality of features from natural language digital text input. The watermark inserter may be configured to modify the deep structure based, at least partly, on a watermark. The natural language generator may be configured to generate natural language digital text output based on the modified deep structure.

In a fourth aspect of the invention, a system for indicating a presence of watermarking of natural language digital text is provided. The system may include means for generating a deep structure and extracting a plurality of features from natural language digital text sentence input; means for determining whether the deep structure corresponding to a natural language sentence has at least one marker feature, means for determining whether a deep structure including the at least one marker feature also includes at least one watermark feature; and means for indicating whether a document including natural language digital text sentences has a watermark based on a percentage of natural language digital text sentences including the at least one marker feature that also include the at least one watermark feature.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a list of parser output features of a parser that may be used in embodiments of the invention;

FIG. 7 illustrates an example of deep syntactic structure format for an exemplary sentence;

FIG. 8 is a flowchart that explains exemplary processing in an embodiment of the invention;

FIG. 9 is a functional block diagram of a second embodiment of the invention;

FIG. 10 illustrates exemplary output of a Charniak parser, which may be used in embodiments of the invention;

FIG. 11 is an exemplary sentence dependency structure, which may be produced in embodiments of the invention;

FIG. 12 is a flowchart that explains exemplary processing in a second embodiment of the invention;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary Processing Device

Figure 1:
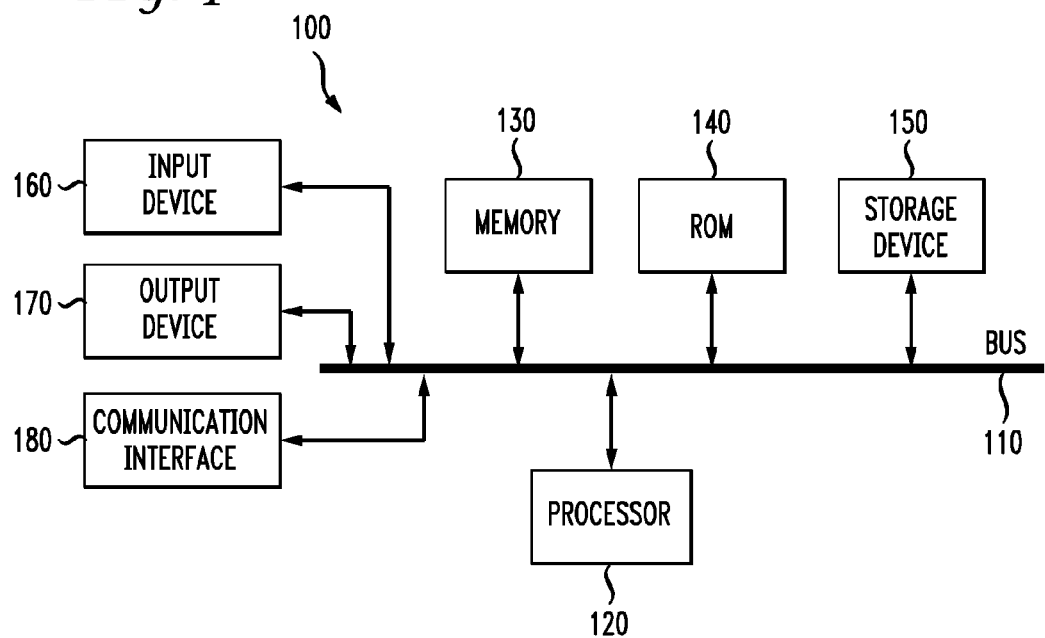
FIG. 1 illustrates an exemplary processing device that may be used to implement embodiments of the invention.

FIG. 1 illustrates a block diagram of an exemplary processing device 100 which may be used to implement systems and methods consistent with the principles of the invention. Processing device 100 may include a bus 110, a processor 120, a memory 130, a read only memory (ROM) 140, a storage device 150, an input device 160, an output device 170, and a communication interface 180. Bus 110 may permit communication among the components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive.

Input device 160 may include one or more conventional mechanisms that permit a user to input information to system 200, such as a keyboard, a mouse, a pen, a voice recognition device, a microphone, a headset, etc. Output device 170 may include one or more conventional mechanisms that output information to the user, including a display, a printer, one or more speakers, a headset, or a medium, such as a memory, or a magnetic or optical disk and a corresponding disk drive. Communication interface 180 may include any transceiver-like mechanism that enables processing device 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

Processing device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Processing device 100 may be, for example, a personal computer (PC), or any other type of processing device capable of processing textual or voice data. In alternative implementations, such as, for example, a distributed processing implementation, a group of processing devices 100 may communicate with one another via a network such that various processors may perform operations pertaining to different aspects of the particular implementation.

Overview

Implementations consistent with the principles of the invention may apply syntactic transformations, such as, for example, passivization and clefting, which change the syntactic structure of a sentence with little effect on its meaning. Some common syntactic transformations in English are listed in Table 1. In addition to these, there is another group of syntactic transformations that are solely based on categorization of a main verb of the sentence. Verbs can be classified according to shared meaning and behavior, and different classes of verbs may allow different transformations to be performed in a sentence. Examples of a transformation known as locative alternation are given below.

Jack sprayed paint on the wall.=>Jack sprayed the wall with paint.

Henry cleared the dishes from the table.=>Henry cleared the table of the dishes.

TABLE 1

Some common syntactic transformations in English.

| Transformation | Original sentence | | Transformed sentence |
|---|---|---|---|
| Passivization | The dog kissed the big boy. | ⇒ | The big boy was kissed by the dog. |
| Topicalization | I like bagels. | ⇒ | Bagels, I like. |
| Clefting | He bought a brand new car. | ⇒ | It was a brand new car that he bought. |
| Extraposition | To believe that is difficult. | ⇒ | It is difficult to believe that. |
| Preposing | I like big bowls of beans. | ⇒ | Big bowls of beans are what I like. |
| There-construction | A unicorn is in the garden. | ⇒ | There is a unicorn in the garden. |
| Pronominalization | I put the letter in the mailbox. | ⇒ | I put it there. |
| Fronting | "What!" Alice cried. | ⇒ | "What!" cried Alice. |

Several different natural language processing (NLP) tools may be involved in the process of a natural language based watermarking system. Implementations consistent with the principles of the invention may integrate several NLP systems to build a system that may take, for example, a raw sentence as input and, after processing the sentence, may revert it back to a raw sentence (surface) level. Implementations consistent with the principles of the invention may parse a sentence syntactically, process the parser output to insert modifications as a result of applying a pattern generated by applying a secret key to a watermark, and re-generate the sentence back to surface level using a natural language generation tool.

Natural language parsers may obtain a syntactic/semantic tree structure of natural language sentences with lexical features extracted. Natural language generators may convert the transformed structures back to natural language text. Implementations consistent with the principles of the invention may convert parser outputs to a form for input to a natural language generator without information loss for automating embedding of the pattern generated by application of the secret key to the watermark.

First Exemplary Embodiment

Figure 2:
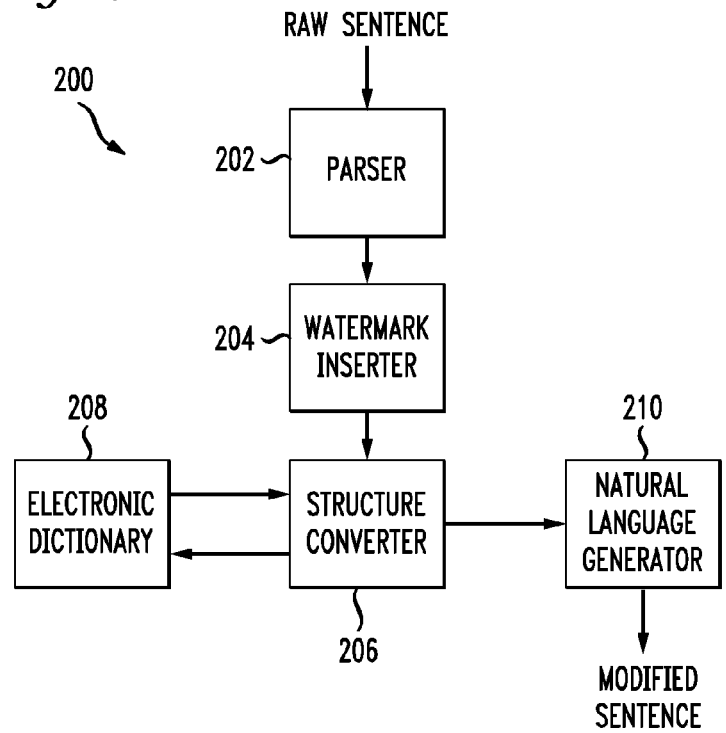
FIG. 2 illustrates a functional block diagram of a first embodiment consistent with the principles of the invention.

FIG. 2 is a functional block diagram of an exemplary embodiment 200, consistent with the principles of the invention, that may be implemented using one or more processing devices, such as exemplary processing device 100 (FIG. 1). Embodiment 200 may include a parser 202, a watermark inserter 204, a structure converter 206, an electronic dictionary 208 and a natural language generator 210.

A deep structure is a term used to denote a core semantic and/or syntactic structure of a sentence or a sentence fragment, which is preserved even after the sentence is rephrased. For example, the sentences "Ned loves Jody" and "Jody is loved by Ned" convey the same information in two different forms. Parser 202 may generate a deep structure, such as, for example, a derivation tree, as well as a parse tree and may extract lexical features. In one implementation, parser 202 may include the XTAG parser, which is well-known to those of ordinary skill in the art and is available from the University of Pennsylvania.

The XTAG parser is based on Tree Adjoining Grammars (TAG). In TAG, every word is represented with an elementary tree that shows its argument structure. Elementary trees are adjoined to form the parse tree of a sentence. The parse tree represents a surface constituent structure, such as verb phrases, noun phrases, etc. The derivation tree on the other hand represents a derivation history of adjoining operations performed during generation of the parse tree. The derivation tree may also be interpreted as a dependency graph with unlabeled arcs between words of the sentence.

Figures 3, 4, 6:
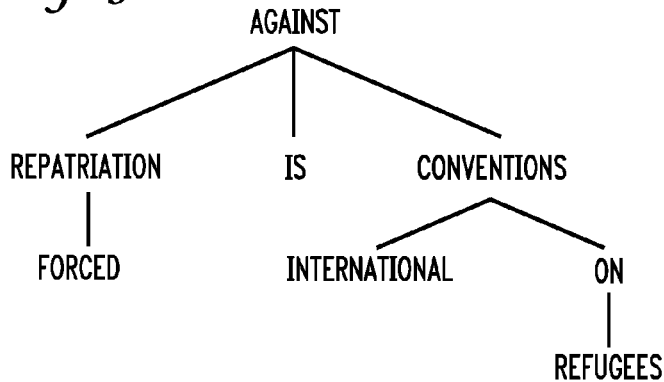
FIG. 3 illustrates an exemplary derivation tree that may be produced by embodiments of the invention.
FIG. 4 illustrates an exemplary syntactically annotated sentence that may be output by a parser in an embodiment of the invention.
FIG. 6 illustrates an exemplary extracted feature table corresponding to features of sentences in natural language digital text input.

FIG. 3 illustrates a derivation tree that may be produced by the XTAG parser for the sentence, "Forced repatriation is against international convention on refugees." FIG. 4 illustrates an exemplary syntactically annotated sentence that may be output by the XTAG parser. FIG. 5 illustrates a list of XTAG parser output features and their possible values. Detailed Information about the XTAG parser can be found in, "A Lexicalized Tree Adjoining Grammar for English", by the XTAG Research Group, Feb. 26, 2001, which is herein incorporated by reference in its entirety.

Watermark inserter 204 may receive output of parser 202 and may apply secret key k, which may be a pseudo-randomly generated number, to a group of possible sentence features to cause a selection of one or more orthogonal possible sentence features as a marker feature. A marker feature is a feature existing in a sentence that indicates that the sentence is to have a watermark w inserted. The secret key may also be applied to a set of predefined watermark features to cause a selection of orthogonal watermark features for insertion into sentences marked by the one or more marker features. The orthogonal watermark features may then be applied to the natural language digital text to produce natural language digital text that matches the orthogonal watermark pattern of features. This may best be understood by way of a simple example. Suppose the selected orthogonal watermark pattern of features concern the features F1 and F2, where F1 indicates a sentence having at least two finite verbs, and F2 indicates a sentence having a preposition. Further suppose that the selected marker feature M1 is a sentence being in the active voice. The original text may be:

S1: The lot at the corner of Valden and Ocean is considered one of the most desirable lots in Thornton Manor by Cognoscenti.
S2: But they have not always thought so.
S3: The lot was bought by Cassidy Bartlett in 1972.
S4: At the time it was empty.
S5: Only sparrows lived on it.
S6: Now, the space is occupied by a six story luxury condominium and many people shop there.

FIG. 6 illustrates an exemplary extracted feature table corresponding to the features of sentences S1 through S6. As can be seen, sentence S6, is the only sentence with at least two finite verbs and sentences S1, S3 and S6 are the only sentences with prepositions. Sentences S2, S4 and S5 are the only sentences that satisfy the marker feature M1. Thus, watermark inserter 204 may apply F1 and F2 to only the marked sentences, S2, S4 and S5. Thus, after watermark inserter 204 inserts the watermark, the deep structure of sentences S2, S4 and S5 may be modified such that natural language generator 210 may generate the following based on input sentences S1 through S6. In order to avoid confusion, the generated output sentences are labeled OS1-OS4.

OS1: The lot at the corner of Valden and Ocean is considered one of the most desirable lots in Thornton Manor by Cognoscenti.
OS2: But they have not always thought of the lot as so and Cassidy Bartlett bought the lot in 1972.
OS3: At the time the lot at the corner of Valden and Ocean was empty and only sparrows lived on it.
OS4: Now, the space is occupied by a six story luxury condominium and many people shop there.

As can be seen from the above, sentences S2 and S3 were combined to form OS2 and a preposition was added to the resulting sentence, OS2. Sentences S4 and S5 were combined to form OS3 and a preposition was added to sentence OS3.

Further, there may be situations in which it may be impossible to insert a particular watermark feature into a marked sentence. In such a case, the sentence may be unmarked. That is, for example, if a marking feature of the sentence is the sentence being in an active voice, the sentence may be transformed to a passive voice to remove the marking feature.

In other implementations, more complicated watermark patterns may be selected. For example, a number of combination of watermarked features may be selected for marked sentences, such as, for every group of three marked sentences, a first marked sentence may have watermarked features F1 and F2 applied, a second marked sentence may have watermarked features F3 and F4 applied, and a third marked sentence may have watermarked features F1 and F4 applied, assuming that all watermark and marker features are orthogonal to one another.

Structure converter 206 may receive, as input, a deep structure, such as, for example, a derivation tree. FIG. 3 illustrates an example of a derivation tree. Structure converter 206 may convert the tree to a format expected by natural language generator 210. In one implementation, natural language generator 210 may be RealPro, which is a well-known natural language generator available from CoGenTex, Inc. of Ithaca, N.Y. RealPro expects input to be in a deep syntactic structure (DSyntS) format for sentence level surface realization.

DSyntS is a syntactic dependency representation for a sentence or sentence fragment. DSyntS specifies a lexical and syntactic composition of a sentence in a formalism based on the Meaning-Text Theory (MTT) of Igor Mel'cuk and colleagues (see "Dependency Syntax: Theory and Practice", Igor Mel'cuk. State University of New York Press, 1988, "Surface Syntax of English: A Formal Model within the Meaning-Text Framework", Igor Mel'cuk and Nikolaj Pertsov., John Benjamins Publishing Company, 1987, and "Collins COBUILD English Grammar. Harper Collins Publishers, 1990, all of which are incorporated by reference herein in their entirety). According to this formalism, a sentence specification has the following salient features:

- Each DSyntS is a tree with labeled nodes and labeled arcs.
- A DSyntS is lexicalized, meaning that the nodes are labeled with lexemes (uninflected words) from the target language.
- A DSyntS is a dependency representation and not a phrase-structure representation: there are no nonterminal nodes (such as verb phrases (VPs)), and all nodes are labeled with lexemes.
- A DSyntS is a syntactic representation, meaning that the arcs of the tree are labeled with syntactic relations such as subject, rather than conceptual (or "semantic") relations such as "agent".
- The DSyntS is a deep syntactic representation, meaning that only meaning-bearing lexemes are represented, and not function words.

FIG. 7 illustrates the deep syntactic structure format for the sentence, "Forced repatriation is against international convention on refugees."

Structure converter 206 may use electronic dictionary 208 as a resource when converting plural nouns to singular form and verbs to a base form as may be required in implementations that use the DSyntS format. In one implementation, WordNet® may be used as electronic dictionary 208. WordNet® is a well-known online lexical reference system developed by the Cognitive Science Laboratory at Princeton University.

Natural language generator 210 may generate sentence level surface realization from a deep structure, for example, DSyntS format, or any other suitable format. As mentioned above, RealPro may be used as natural language generator 210 in some implementations of the invention.

FIG. 8 illustrates a flowchart of an exemplary process that may be performed in an embodiment of the invention. The process may begin by watermark inserter 204 applying a secret key k to possible marker features and to watermark features to select orthogonal subsets for marker features and watermark features (act 802). Next, parser 202 may extract lexical features from raw natural language sentences and may form corresponding deep structures, such as, for example, a derivation tree or other deep structure for each sentence (act 804). Watermark inserter 204 may then examine a first sentence by means of its corresponding deep structure (act 804). Watermark inserter 204 may determine whether the deep structure corresponding to the sentence has one or more selected marker features (act 808). If watermark inserter 204 determines that the deep structure has the one or more selected marker features, then watermark inserter 204 may modify the deep structure to insert the one or more selected watermark features (act 810).

If, in act 808, watermark inserter 204 determines that the deep structure corresponding to the sentence does not have the one or more selected marker features or after watermark inserter 204 modifies the deep structure, in act 810, watermark inserter 204 may determine whether there are more deep structures corresponding to sentences (act 812). If there are one or more additional deep structures, then watermark inserter 204 may examine a deep structure corresponding to a next sentence (act 814) and may repeat acts 808-812.

If, in act 812, watermark inserter 204 determines that the current deep structure corresponds to a last sentence, then structure converter 206 may convert the deep structures, including any modified deep structures, to a format expected by natural language generator (act 816). Natural language generator 210 may then generate sentences based on the expected format (act 818). In one implementation, natural language generator 210 may be RealPro, which may expect input in the DSyntS format.

Second Exemplary Embodiment

FIG. 9 is a functional block diagram of a second exemplary embodiment 900, consistent with the principles of the invention, that may be implemented using one or more processing devices, such as exemplary processing device 100 (FIG. 1). Embodiment 900 may include parsers 902, 202, a dependency structure producer 904, watermark inserter 204, a structure converter, 906, electronic dictionary 208 and natural language generator 210. Parser 202, watermark inserter 204, electronic dictionary 208 and natural language generator 210 may be the same as used in embodiment 200.

Parser 902 may parse raw input sentences to produce a syntactically annotated output. In one implementation, parser 902 may be a Charniak parser. The Charniak parser is well known in the art and is a maximum-entropy-inspired parser developed at Brown University. The Charniak parser produces syntactically annotated parsed sentences in the well-known PennTreebank format and is generally more accurate than the XTAG parser. FIG. 10 illustrates an output of the Charniak parser for the sentence, "Forced repatriation is against international convention on refugees."

Dependency structure producer 904 may convert the output of parser 902 to a dependency structure. In implementations in which parser 902 is the Charniak parser, dependency structure producer may be LEXTRACT. LEXTRACT is a well-known tool for converting phrase structures, such as, for example, that shown in FIG. 10, to a sentence dependency structure. FIG. 11 illustrates a sentence dependency structure for the sentence, "Forced repatriation is against international convention on refugees."

FIG. 12 is a flowchart that illustrates an exemplary process that may be implemented in embodiment 900. Acts 1202-1214 correspond to acts 802-814 of the flowchart of FIG. 8 with respect to embodiment 200. In parallel with acts 1202-1214, parser 902 may input one or more natural language sentences and may generate corresponding syntactically annotated parsed sentence(s) (act 1216). In one implementation, parser 902 may be a Charniak parser. Next, dependency structure producer 904 may generate a dependency structure corresponding to each of the syntactically annotated parsed sentence(s) from the output of parser 902 (act 1218). In one implementation, dependency structure producer 904 may be LEXTRACT, as described previously.

Structure converter 906 may then input the modified deep structure from watermark inserter 204, may input the sentence dependency structure of dependency structure producer 904 and may convert the dependency tree to a format expected by natural language generator (act 1220). In one implementation, parser 202 is an XTAG parser and parser 902 is a Charniak parser. Because the Charniak parser is more accurate than the XTAG parser, it was thought that combining both parser outputs to produce input for natural language generator 210 would produce more accurate sentence transformations. Next, natural language generator 210 may generate a natural language sentence based on output of structure converter 906 (act 1222). In one implementation, structure converter 906 may generate output in DSyntS format for natural language generator 210, which may be RealPro, as described previously.

Watermark Reader

Figure 13:
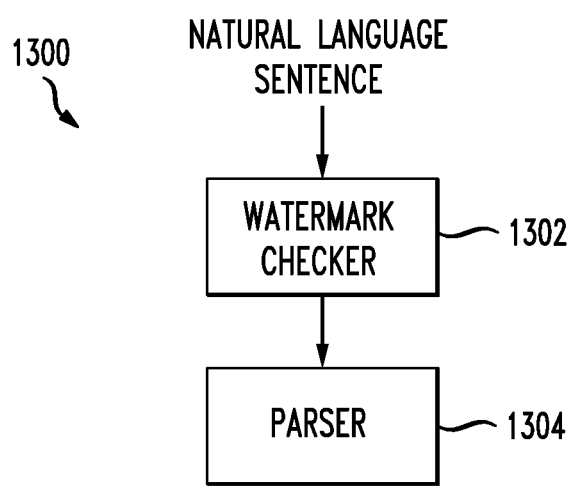
FIG. 13 is a functional block diagram of an exemplary watermark reader consistent with the principles of the invention.

A watermark reader may analyze natural language text to determine whether the natural language text includes a watermark. FIG. 13 is a functional block diagram of a watermark reader 1300, which may be implemented using one or more processing devices, such as exemplary processing device 100.

Watermark reader 1300 may include parser 1302 and watermark checker 1304. In one implementation, parser 1302 may be the XTAG parser. In another implementation, parser 1302 may be the Charniak parser. Other implementations may use other parsers.

Parser 1302 may analyze each input natural language sentence, may extract a group of features and may generate corresponding deep structures. Watermark checker 1304 may determine whether each deep structure corresponding to a sentence includes one or more marker features. If so, watermark checker 1304 may determine whether the deep structure includes one or more watermarked features. In one implementation consistent with the principles of the invention, watermark checker 1304 may determine whether a threshold level of marked sentences includes watermarked features. If so, the document including the sentences may be declared to be watermarked by watermark checker 1304. The threshold level may be 80% of the marked sentences or some other suitable level.

Figure 14A:
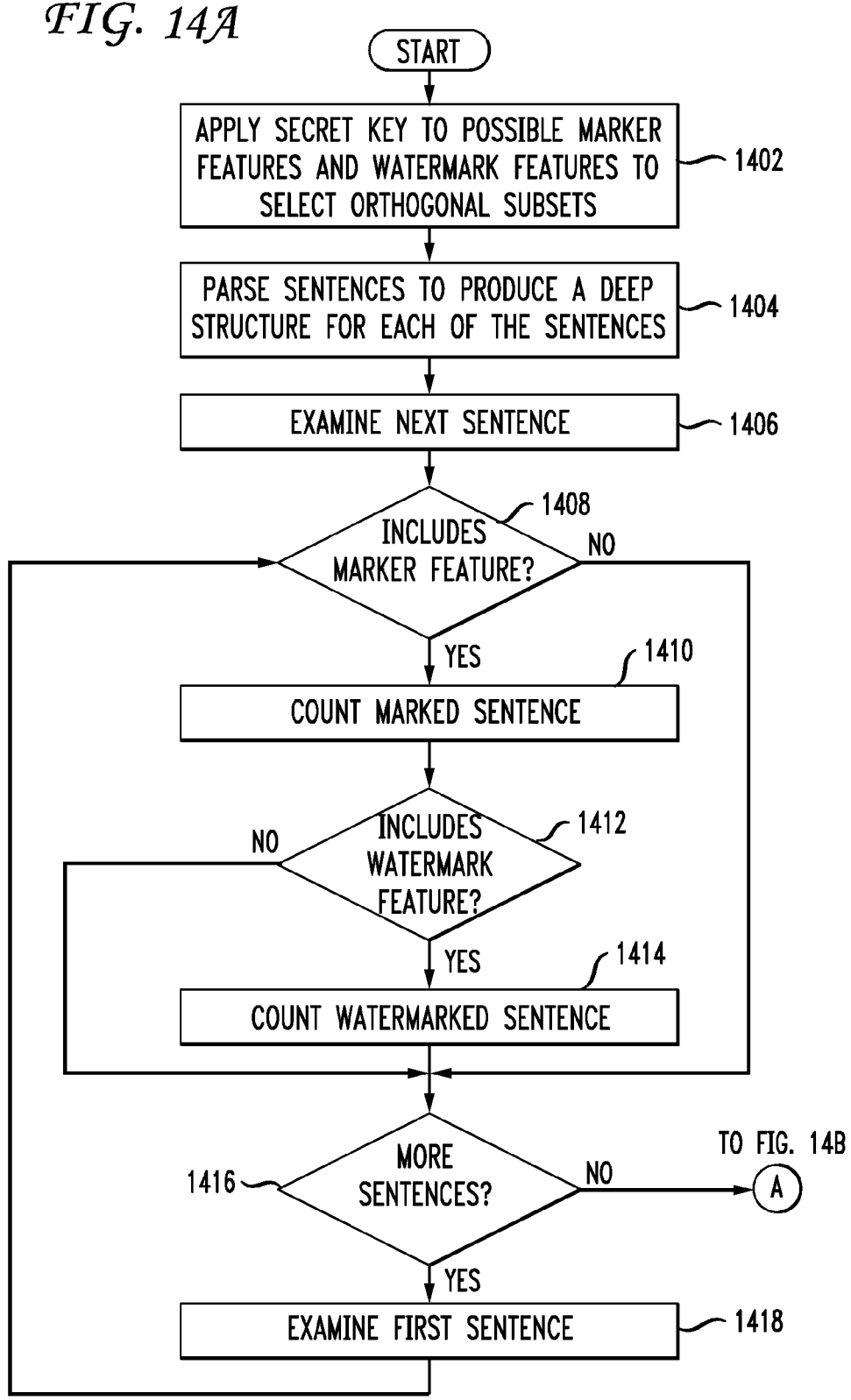
FIGS. 14A and 14B show a flowchart of an exemplary process that may be performed by the exemplary watermark reader of FIG. 13.
Figure 14B:
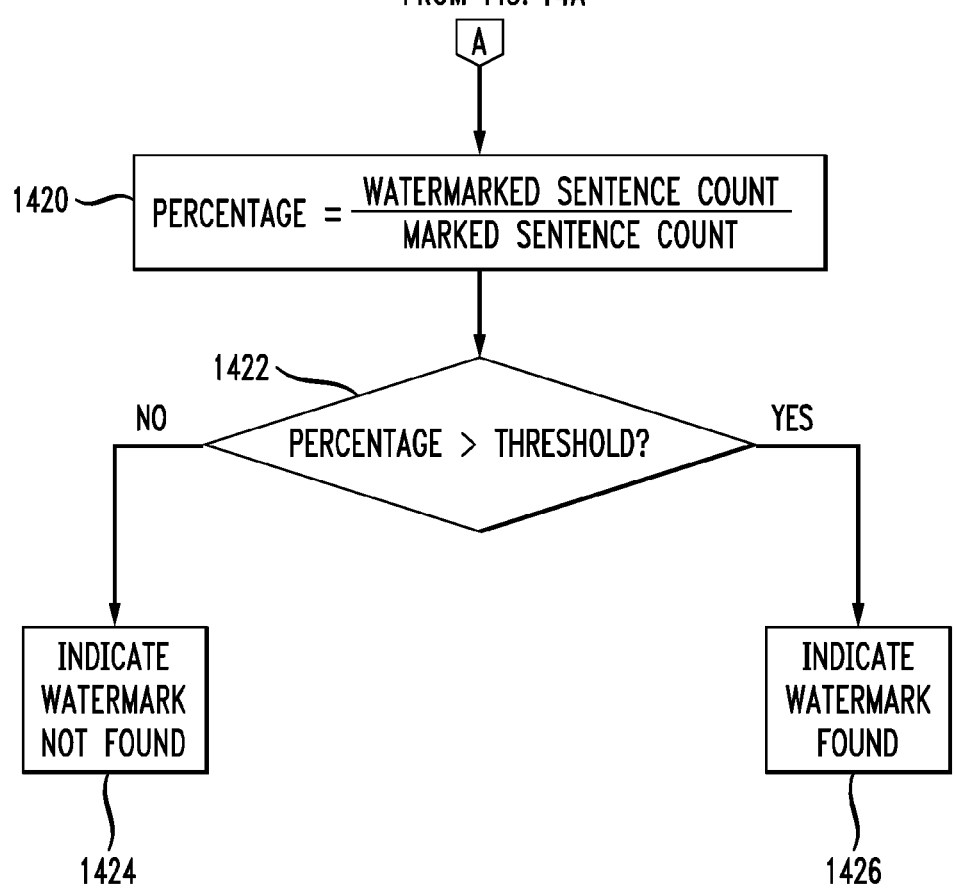

FIGS. 14A and 14B are a flowchart of an exemplary process that may be performed by watermark reader 1300. The process may begin with watermark checker 1304 applying secret key k to possible marker features and watermark features to select one or more orthogonal marker feature(s) and watermark feature(s) (act 1402). Parser 1404 may parse natural language sentences to produce a deep structure for each of the sentences (act 1404). Watermark checker 1304 may then be set to examine the deep structure corresponding to the first natural language sentence (act 1406). Watermark checker 1304 may then determine whether the sentence has the marker feature(s) (act 1408).

If watermark checker 1304 determines that the sentence has the marker feature(s), then watermark checker 1304 may increment a number of marked sentences (act 1410). Watermark checker 1304 may then determine whether the sentence includes the watermarked feature(s) (act 1412). If watermark checker 1304 determines that the sentence has the watermarked feature(s), then watermark checker 1304 may increment a count of the watermarked sentences (act 1414).

If, at act 1408, watermark checker 1304 determines that the sentence does not include the marker feature(s) or watermark checker 1304 has already determined that the sentence includes the watermarked feature(s) and has incremented the count of watermarked sentences at act 1414, then watermark checker 1304 may determine whether more deep structures corresponding to more sentences exist (act 1416). If so, then watermark checker 1304 may prepare to examine a next deep structure corresponding to a next sentence (act 1418) and may again perform acts 1408-1416.

If, at act 1416, watermark checker 1304 determines that there are no more deep structures to be examined, then watermark checker 1304 may calculate a percentage of marked sentences that are watermarked (act 1420; FIG. 14B). Watermark checker 1304 may then determine whether the calculated percentage is greater than a threshold, such as, for example, 80% or another suitable percentage (act 1422). If the percentage exceeds the threshold, then watermark checker 1304 may indicate that a document including the input natural language sentences is watermarked (act 1426). Otherwise, watermark checker 1304 may indicate that the document is not watermarked (act 1424). The indication may be made in a number of different ways including, for example, by audio means, by displaying a message on a display, or by printing a message on an output device, such as a printer.

Testing Results and Quantitative Evaluation

The evaluation of natural language watermarking systems present unique and difficult challenges compared to the evaluation of audio, image or video watermarking systems. Automatic semantic text analysis is not as developed as automatic analysis of audio and visual documents. Even though recent progress in Machine Translation (MT) research has led to a first step in addressing the adequacy of machine translated text, evaluating other text features such as coherence and fluency are being studied.

Due to these limitations, evaluation tests were focused on checking the success of the embodiments in re-generating a sentence that is as close to the original as possible. This may be achieved by using MT evaluation systems, since they are already based on checking quality of the output of a MT system by comparing it to a reference high quality translation. The MT Evaluation Tool Kit of NIST was used to evaluate the quality of the re-generated sentences in the embodiments. This toolkit outputs scores for BLEU (BiLingual Evaluation Understudy) metric and NIST metric.

BLEU computes a geometric mean of variable length phrase matches (precision) against reference translations. The BLEU metric ranges from 0 to 1. Only the translations that are identical to a reference translation will attain 1. BLEU measures translation accuracy according to phrase matches with one or more high quality reference translations. BLEU has been found to generally rank systems in the same order as human assessments.

The NIST metric was introduced in 2002. The NIST metric is a modified version of BLEU where an arithmetic mean of information weight of the variable length phrase matches are used, instead of arithmetic mean of N-gram precisions.

Both BLEU and NIST metrics are sensitive to a number of reference translations. The more reference translations per sentence there are, the higher the BLEU and NIST scores are. However, in tests that we conducted we were not able to provide more than one reference translation. The original sentences were used as the reference translation, because a quality test was based on re-generating a sentence that was as close to the original as possible. Each sentence was a separate document due to the fact that the embodiments were performing conversion at a sentence level.

Table 2 and Table 3 show the evaluation results for embodiment 200, using an XTAG parser and RealPro, and for embodiment 900, using a Charniak parser, LEXTRACT and RealPro. These are the lower bounds to these systems' accuracy. Embodiment 200 scores 0.4532. This score also contains the cases where the generated sentence is grammatically correct and carries the same meaning but the order of the words is not the same as in the original sentence. An example of such a case happens when "doctors said he was alive but in critical condition." goes through embodiment 200, it turns to "he was alive but in critical condition doctors said." This sentence translation scores 0.7260 with a BLEU 4-gram metric.

TABLE 2

| | Cumulative N-gram scoring | | | | |
|---|---|---|---|---|---|
| | 1-gram | 2-gram | 3-gram | 4-gram | 5-gram |
| NIST: | 7.3452 | 9.0238 | 9.2225 | 9.2505 | 9.2536 |
| BLEU: | 0.8511 | 0.6694 | 0.5448 | 0.4532 | 0.3821 |

TABLE 3

| | Cumulative N-gram scoring | | | | |
|---|---|---|---|---|---|
| | 1-gram | 2-gram | 3-gram | 4-gram | 5-gram |
| NIST: | 6.2987 | 7.3787 | 7.4909 | 7.4962 | 7.4965 |
| BLEU: | 0.7693 | 0.5096 | 0.3484 | 0.2439 | 0.1724 |

Even though embodiment 900 uses more information, its score of 0.2439 is lower than that of embodiment 200. Embodiment 900 suffers from the fact that a combination algorithm for the outputs of two different parsers is very simple: Currently, feature and part-of-speech (POS) tag information may be taken from an XTAG parser output and loaded to a dependency or derivation structure generated by a Charniak parser and LEXTRACT. The combination algorithm may be improved upon. The capabilities of the parser and the natural language generator may also limit the embodiments. For example, due to the fact that RealPro is not designed for English to English translation, it has a limited expression power. A few examples of such limitations are handling of punctuation or adjuncts.

CONCLUSION

The above-described embodiments are exemplary and are not limiting with respect to the scope of the invention. Embodiments within the scope of the present invention may include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Tangible computer readable storage media expressly excludes communication media, carrier waves, wireless media, transmission media and signals per se.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in networked computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Accordingly, the appended claims and their legal equivalents should only define the invention, rather than any specific examples given.

We claim as our invention:

1. A method for watermarking natural language digital text using a computing device, the method causing the computing device to perform steps comprising:
    generating via a processor a deep structure and extracting a plurality of features from natural language digital text input;
    inserting a watermark into the natural language digital text input based on the plurality of features;
    modifying the deep structure based, at least partly, on the watermark; and
    generating via the processor natural language digital text output based on the modified deep structure.

2. The method of claim 1, wherein generating a deep structure and extracting a plurality of features from natural language digital text input further comprises:
    parsing the natural language digital text input with an XTAG parser to produce the deep structure and extract the plurality of features.

3. The method of claim 1, further causing the computing device to perform a step comprising:
converting the modified deep structure to a deep syntactic structure format, wherein the natural language digital text output is generated from the modified deep structure in the deep syntactic structure format.

4. The method of claim 3, wherein converting the modified deep structure to a deep syntactic structure format further comprises:
converting plural nouns to singular form and verbs to base form by using an electronic dictionary as a resource.

5. The method of claim 3, wherein generating natural language digital text output based on the converted deep structure further comprises:
generating the natural language text output from the converted modified deep structure in the deep syntactic structure format by using RealPro.

6. The method of claim 3, further causing the computing device to perform a step comprising:
generating a dependency structure from the natural language digital text input, wherein
converting the modified deep structure to a deep syntactic structure format further comprises:
using the dependency structure when converting the modified deep structure to the deep syntactic structure format.

7. The method of claim 1, wherein modifying the deep structure based, at least partly, on a watermark further comprises:
applying a secret key to the watermark to derive a pattern of features; and
modifying the deep structure, based at least partly on the plurality of extracted features, to correspond to the derived pattern of features.

8. A tangible machine-readable storage medium having instructions recorded thereon for controlling at least one processor, the instructions causing the processor to perform steps comprising:
generating a deep structure and extracting a plurality of features from natural language digital text input;
inserting a watermark into the natural language digital text input based on the plurality of features;
modifying the deep structure based, at least partly, on the watermark; and
generating natural language digital text output based on the modified deep structure.

9. The tangible machine-readable storage medium of claim 8, wherein the instructions for generating a deep structure and extracting a plurality of features from natural language digital text input further comprise:
parsing the natural language digital text input with an XTAG parser to produce the deep structure and extract the plurality of features.

10. The tangible machine-readable storage medium of claim 8, the instructions further comprising:
converting the modified deep structure to a deep syntactic structure format, wherein
generating natural language digital text output based on the converted modified deep structure further comprises generating the natural language digital text output from the modified deep structure in the deep syntactic structure format.

11. The tangible machine-readable storage medium of claim 10, wherein the instructions for converting the modified deep structure to a deep syntactic structure format further comprise:
converting plural nouns to singular form and verbs to base form by using an electronic dictionary as a resource.

12. The tangible machine-readable storage medium of claim 10, wherein the instructions for generating natural language digital text output based on the converted modified deep structure further comprise:
generating the natural language text output from the converted modified deep structure in the deep syntactic structure format by using RealPro.

13. The tangible machine-readable storage medium of claim 10, further comprising:
generating a dependency structure from the natural language digital text input, wherein
converting the modified deep structure to a deep syntactic structure format further comprise
using the dependency structure when converting the modified deep structure to the deep syntactic structure format.

14. The tangible machine-readable storage medium of claim 8, wherein the instructions for modifying the deep structure based, at least partly, on a watermark further comprises:
applying a secret key to the watermark to derive a pattern of features; and
modifying the deep structure, based at least partly on the plurality of extracted features, to correspond to the derived pattern of features.

15. A system for watermarking natural language digital text, the system comprising:
a processor;
a parser that causes the processor to generate a deep structure and extract a plurality of features from natural language digital text input;
a watermark inserter that inserts a watermark into the natural language digital text input based on the plurality of features;
a modifier that causes the processor to modify the deep structure based, at least partly, on the watermark; and
a natural language generator that causes the processor to generate natural language digital text output based on the modified deep structure.

16. The system of claim 15, wherein the parser is an XTAG parser.

17. The system of claim 15, further comprising:
a structure converter that causes the processor to convert the modified deep structure to a deep syntactic structure format, wherein the natural language generator further that causes the processor to generate the natural language digital text output from the modified deep structure in the deep syntactic structure format.

18. The system of claim 17, wherein the structure converter further causes the processor to convert plural nouns to singular form and verbs to base form by using an electronic dictionary as a resource.

19. The system of claim 17, wherein the natural language generator includes RealPro.

20. The system of claim 17, further comprising:
a second parser that causes the processor to generate a dependency structure from the natural language digital text input, wherein
the structure converter further causes the processor to use the dependency structure when converting the modified deep structure to the deep syntactic structure format.

21. The system of claim 15, wherein the watermark inserter further causes the processor to:
apply a secret key to the watermark to derive a pattern of features; and modify the deep structure, based at least partly on the plurality of extracted features, to correspond to the derived pattern of features.

22. A system for indicating a presence of watermarking of natural language digital text, the system comprising:
a processor;
first means for controlling the processor to generate a deep structure and extracting a plurality of features from natural language digital text sentence input;
second means for controlling the processor to determine whether the deep structure corresponding to a natural language sentence has at least one marker feature;
third means for controlling the processor to determine whether a deep structure including the at least one marker feature also includes at least one watermark feature; and
fourth means for controlling the processor to indicate whether a document including natural language digital text sentences has a watermark based on a percentage of natural language digital text sentences including the at least one marker feature that also include the at least one watermark feature.

* * * * *

UNITED STATES PATENT AND TRADEMARK OFFICE
CERTIFICATE OF CORRECTION

PATENT NO. : 8,589,148 B2  
APPLICATION NO. : 11/279835  
DATED : November 19, 2013  
INVENTOR(S) : Mikhail Atallah et al.

Page 1 of 1

It is certified that error appears in the above-identified patent and that said Letters Patent is hereby corrected as shown below:

In the Claims

Col. 12, Claim 1, line 59, change "watermark; and" to --watermark, to yield a modified deep structure; and--

Col. 13, Claim 3, line 6, change "syntactic structure format" to --syntactic structure format, to yield a converted modified deep structure--

Col. 13, Claim 7, line 35, change "derived pattern of features" to --pattern of features--

Col. 13, Claim 8, line 45, change "watermark; and" to --watermark, to yield a modified deep structure; and--

Col. 13, Claim 10, line 58, change "structure format, wherein" to --structure format, to yield a converted modified deep structure, wherein--

Col. 14, Claim 15, line 38, change "on the watermark; and" to --on the watermark, to yield a modified deep structure; and--

Signed and Sealed this
Eighteenth Day of August, 2015

Michelle K. Lee
*Director of the United States Patent and Trademark Office*